US008637183B2

(12) United States Patent
Boden et al.

(10) Patent No.: US 8,637,183 B2
(45) Date of Patent: Jan. 28, 2014

(54) EXPANDERS FOR LEAD-ACID BATTERIES

(75) Inventors: David Paul Boden, Charlottesville, VA (US); Daniel V. Loosemore, Crown Point, IN (US)

(73) Assignee: Hammond Group, Inc., Hammond, IN (US)

(*) Notice: Subject to any disclaimer, the term of this patent is extended or adjusted under 35 U.S.C. 154(b) by 531 days.

(21) Appl. No.: 12/231,347

(22) Filed: Sep. 2, 2008

(65) Prior Publication Data

US 2009/0325068 A1 Dec. 31, 2009

Related U.S. Application Data

(63) Continuation-in-part of application No. 11/810,659, filed on Jun. 6, 2007, now abandoned.

(51) Int. Cl.
H01M 4/13 (2010.01)
H01M 4/58 (2010.01)
(52) U.S. Cl.
USPC ............. 429/215; 429/231.4; 252/182.1
(58) Field of Classification Search
USPC ............. 429/215, 231.4; 252/182.1
See application file for complete search history.

(56) References Cited

U.S. PATENT DOCUMENTS

| 5,223,352 | A | * | 6/1993 | Pitts et al. | 429/225 |
| 5,368,960 | A | * | 11/1994 | Rowlette | 429/227 |
| 6,740,452 | B2 | * | 5/2004 | Ma | 429/228 |
| 7,083,876 | B2 | | 8/2006 | Honbo et al. | |
| 7,118,830 | B1 | | 10/2006 | Boden et al. | |
| 8,021,784 | B2 | | 9/2011 | Boden | |
| 2003/0235759 | A1 | | 12/2003 | Honbo et al. | |

OTHER PUBLICATIONS

International Search Report for corresponding PCT application PCT/US2009/004941, dated Nov. 4, 2009 (one page).
International Preliminary Report on Patentability for corresponding PCT application PCT/US2009/004941, dated Mar. 8, 2011 (six pages).

* cited by examiner

Primary Examiner — Karie O'Neill Apicella
(74) Attorney, Agent, or Firm — Patula & Associates, P.C.

(57) ABSTRACT

An expander formulation used in battery paste compositions. The expander formulation incorporates effective amounts, or elevated concentrations of up to 6% of graphite and mixtures of carbon black and graphite to lessen or minimize the accumulation of lead sulfate on the surface of the negative plate during high rate PSOC battery operation, and/or to increase the electrochemical efficiency, the reserve capacity, the cold cranking performance and the cycle life of lead-acid batteries.

17 Claims, 13 Drawing Sheets

| | Conventional Expander Components | | | | | | |
|---|---|---|---|---|---|---|---|
| | Barium Sulfate | | Carbon | | Lignosulfonate | | Addition Rate (% of oxide weight in paste formula) |
| | Concentration Rate | Amount in Negative Active Material | Concentration Rate | Amount in Negative Active Material | Concentration Rate | Amount in Negative Active Material | |
| Flooded Electrolyte Automotive Batteries | 40-60% | 0.2-0.6% | 10-20% | 0.05-0.2% | 25-50% | 0.125-0.5% | 0.5-1.0% |
| Flooded Electrolyte Industrial Motive Power Batteries | 70-90% | 1.4-2.25% | 5-15% | 0.1-0.375% | 3-10% | 0.06-0.25% | 2.0-2.5% |
| Flooded Electrolyte Telecommunications Batteries | 80-95% | 1.6-2.375% | 3-8% | 0.06-0.2% | 0-10% | 0-0.25% | 2.0-2.5% |
| Flooded Electrolyte Uninterruptible Power Supply Batteries | 70-80% | 1.4-2.0% | 5-15% | 0.1-0.375% | 10-20% | 0.2-0.5% | 2.0-2.5% |
| Valve-regulated Batteries | 70-80% | 0.7-0.8% | 10-20% | 0.1-0.2% | 15-50% | 0.15-0.50% | 1.0% |

FIGURE 1

| Improved Expander Components for Hybrid Electric Vehicle Batteries |||||||||
|---|---|---|---|---|---|---|---|
| Barium Sulfate || Lignosulfonate || Carbon Black || Graphite ||
| Amount added to 1000 kg of leady oxide | % Amount in Negative Active Material | Amount added to 1000 kg of leady oxide | % Amount in Negative Active Material | Amount added to 1000 kg of leady oxide | % Amount in Negative Active Material | Amount added to 1000 kg of leady oxide | % Amount in Negative Active Material |
| Example 1 | 8 kg | 0.8% | 6 kg | 0.6% | 20 kg | 2.0% | 20 kg | 2.0% |
| Example 2 | 8 kg | 0.8% | 2 kg | 0.2% | 0 kg | 0.0% | 20 kg | 2.0% |
| Example 3 | 8 kg | 0.8% | 2 kg | 0.2% | 20 kg | 2.0% | 20 kg | 2.0% |
| Example 4 | 8 kg | 0.8% | 2 kg | 0.2% | 10 kg | 1.0% | 10 kg | 1.0% |
| Example 5 | 8 kg | 0.8% | 2 kg | 0.2% | 20 kg | 2.0% | 30 kg | 3.0% |

FIGURE 3

Electron microprobe image of the cross section of
a negative battery plate with conventional expander after 1479 cycles.

Electron microprobe image of the cross section of
a negative battery plate with the expander of Example 1 after 3596 cycles.

Electrochemical efficiency of
negative active material with conventional and improved expanders.

| Expander type | Composition | Electrochemical efficiency (mAh/g) | Percent improvement |
|---|---|---|---|
| Conventional expander | Barium sulfate, 0.8% Lignosulfonate, 0.2% Carbon black, 0.1% | 124.3 | |
| Expander of Example 1 | Barium sulfate, 0.8% Lignosulfonate, 0.6% Carbon black, 2.0% Graphite, 2.0% | 146.9 | 18 |
| Expander of Example 2 | Barium sulfate, 0.8% Lignosulfonate, 0.2% Graphite, 2.0% | 129.5 | 4.1 |
| Expander of Example 3 | Barium sulfate, 0.8% Lignosulfonate, 0.2% Carbon black, 2.0% Graphite, 2.0% | 132.5 | 6.5 |
| Expander of Example 4 | Barium sulfate, 0.8% Lignosulfonate, 0.6% Carbon black, 1.0% Graphite, 1.0% | 136.6 | 9.8 |
| Expander of Example 5 | Barium sulfate, 0.8% Lignosulfonate, 0.2% Carbon black, 2.0% Graphite, 3.0% | 113.29 | -8.3 |

FIGURE 12

| | Improved Expander Components for Standard Automotive Batteries | | | | | | | |
|---|---|---|---|---|---|---|---|---|
| | Barium Sulfate | | Lignosulfonate | | Carbon Black | | Graphite | |
| | Amount added to 1000 kg of leady oxide | % Amount in Negative Active Material | Amount added to 1000 kg of leady oxide | % Amount in Negative Active Material | Amount added to 1000 kg of leady oxide | % Amount in Negative Active Material | Amount added to 1000 kg of leady oxide | % Amount in Negative Active Material |
| Example 6 | 6 kg | 0.6% | 2 kg | 0.2% | 1 kg | 0.1% | 10 kg | 1.0% |
| Example 7 | 6 kg | 0.6% | 3 kg | 0.3% | 0 kg | 0.0% | 3 kg | 0.3% |

FIGURE 13

Reserve capacity and cold cranking test data on
Group 27 and Group 31 batteries containing conventional and improved expanders.

|  | First reserve capacity (min) | Second reserve capacity (min) | Third reserve capacity (min) | First cold cranking test | | Second cold cranking test | |
|---|---|---|---|---|---|---|---|
|  |  |  |  | 30 second volts | Seconds to 7.2 volts | 30 second volts | Seconds to 7.2 volts |
| Group 27 |  |  |  |  |  |  |  |
| Conventional Expander | 147.7 | 138.7 | 140.5 | 7.90 | 56.61 | 8.05 | 48.99 |
| Expander of Example 6 | 149.7 | 142.7 | 145.3 | 8.05 | 61.77 | 8.04 | 62.97 |
| Group 31 |  |  |  |  |  |  |  |
| Conventional Expander | 174.1 | 166.08 | 162.57 | 7.39 | 34.35 | 7.48 | 36.07 |
| Expander of Example 6 | 172.6 | 168.5 | 166.15 | 7.50 | 39.87 | 7.54 | 40.55 |

FIGURE 14

SAE J240 life cycle test results on
Group 27 batteries with conventional and improved expanders.

|  | SAE J240 Cycles at 41°C/105°F |
|---|---|
| Battery with conventional expander | 5920 |
| Battery with expander from Example 6 | 6756 |

FIGURE 15

Reserve capacity and cold cranking test data on
Group 24 batteries containing conventional and improved expanders.

|  | Reserve capacity minutes | Cold cranking performance Seconds to 7.2 volts |
|---|---|---|
| Conventional Expander | 123 | 32.5 |
| Expander of Example 7 | 128 | 35 |

FIGURE 16

EXPANDERS FOR LEAD-ACID BATTERIES

CROSS-REFERENCE TO U.S. APPLICATION

The present application is a continuation-in-part application of U.S. patent application Ser. No. 11/810,659, filed Jun. 6, 2007, now abandoned entitled "Lead-Acid Battery Expanders with Improved Life at High Temperatures," the entire specification and disclosure of which is herein incorporated by reference.

FIELD OF THE INVENTION

The present disclosure relates generally to expanders used in battery pastes, and to processes for producing battery plates. In particular, expander formulations for use in battery pastes and processes for producing negative plates for various lead acid batteries are disclosed. More specifically, the present disclosure comprises one or more expander formulations incorporating graphite. Hybrid electric vehicle batteries incorporating the negative plates made from such expander formulations are characterized by decreased lead sulfate accumulation on the surface of the negative plate, resulting in increased cycle life and/or improved electrochemical efficiency. Standard automotive batteries incorporating the negative plates made from such expander formulations result in considerable improvements to the life cycle of the batteries, as well as reserve capacity and cold cranking performance.

BACKGROUND OF THE INVENTION

The manufacture of battery plates for lead-acid batteries generally involves a paste mixing, curing and drying operation in which the active materials in the battery paste undergo chemical and physical changes that are used to establish the chemical and physical structure and subsequent mechanical strength necessary to form the battery plate. To produce typical battery plates, materials are added to commercial paste mixing machines in the order of lead oxide, water and sulfuric acid, which are then mixed to a paste consistency. Depending on whether negative or positive plates for the batteries are being produced, conventional additives such as a flock or expander may also be used to modify the properties of the paste and the performance of the plates produced. Other additives may be used to enhance or improve the chemical and physical structure and performance of the battery plates, such as the additive disclosed in U.S. Pat. No. 7,118,830 issued to Boden et al. on Oct. 10, 2006, the entire disclosure of which is herein incorporated by reference.

The negative plates of lead-acid batteries are usually produced by preparing a paste with an expander additive, and then applying this battery paste to electrically conducting lead alloy structures known as grids to produce plates. Typically, these pasted plates are then cured in heated chambers containing air with a high relative humidity. This curing process produces the necessary chemical and physical structure required for subsequent handling and performance in the battery. Following curing, the plates are dried using any suitable means. These plates, comprising negative active material, are then suitable for use in the battery.

The expander, which is usually a mixture of barium sulfate, carbon, and a lignosulfonate or other organic material, is added to the negative plate active material during preparation of the paste. The expander may also incorporate other known ingredients, such as wood flour and soda ash, to improve the performance of the battery. The expander materials can be added separately to the paste during the paste mixing process, but an improved procedure is to mix the constituent materials of the expander before adding them to the paste mix.

The expander performs a number of functions in the negative plate, which will be briefly described. The function of the barium sulfate is to act as a nucleating agent for lead sulfate produced when the plate is discharged.

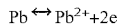

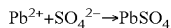

The lead sulfate discharge product deposits on the barium sulfate particles assuring homogeneous distribution throughout the active material and preventing coating of the lead particles. The term barium sulfate represents both blanc fixe and barytes forms of this compound and mixtures thereof in particle sizes from 0.5 to 5 micrometers. It is desirable that the barium sulfate crystals have a very small particle size, of the order of 1 micron or less, so that a very large number of small seed crystals are implanted in the negative active material. This ensures that the lead sulfate crystals, which are growing on the barium sulfate nuclei, are small and of a uniform size so that they are easily converted to lead active material when the plate is charged.

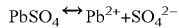

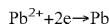

The carbon increases the electrical conductivity of the active material in the discharged state, which improves its charge acceptance. The carbon is usually in the form of carbon black and/or activated carbon. The amount of carbon in the negative active material of conventional expander formulations is only a small fraction of a percent.

The function of the lignosulfonate is more complex. It is chemically adsorbed on the lead active material resulting in a significant increase in its surface area. Without lignosulfonate, the surface area is of the order of approximately 0.2 square meters per gram while, with 0.50% of lignosulfonate, this is increased to approximately 2 square meters per gram. This high surface area increases the efficiency of the electrochemical process which improves the performance of the negative plate. The lignosulfonate also stabilizes the physical structure of the negative active material, which retards degradation during operation of the battery. This property increases the life of the battery in service. The organic material can be any lignosulfonate compound or other suitable organic material that can be adsorbed on the surface of the negative active material and thereby affect its surface area and electrochemical behavior.

Lead-acid batteries are used in a variety of applications including automobiles, industrial motive power, such as for forklift trucks, telecommunications, and standby power systems, i.e., uninterruptible power supply batteries. In addition, the batteries may be of the flooded-electrolyte or valve regulated designs. These require different proportions of the expander components and different addition rates to the active material to give optimum performance and life. Accordingly, expanders can be generally classified according to their application, for example: automotive, industrial motive power and industrial standby power. They may also be subdivided for flooded and valve regulated battery designs. Typical examples of conventional expander formulations for the aforementioned applications are shown in FIG. 1.

A recognized problem with expanders is that the aforementioned conventional expander formulations are not effective, for example, in batteries used in hybrid-electric vehicles. In this application, the battery is operated in a partial-state-of-charge (PSOC) condition which is a condition where it is never fully discharged or fully charged. Under this condition the negative plate always is partially converted to lead sulfate which is not converted to lead by periodic full charging as in conventional batteries. The negative plate also has to be capable of accepting charge at very high rates from current generated during regenerative braking.

It has been shown that, during this type of operation, lead sulfate accumulates on the surface of the negative plate which acts as a barrier to the flow of ions and current necessary to charge the plate. Consequently, the lead sulfate layer progressively increases in thickness resulting in a reduction or degradation in battery performance. Eventually, the performance declines to a point where the battery cannot function properly. A representation of this phenomenon is shown in FIG. 2. This problem has prevented lead-acid batteries from being used in hybrid-electric vehicles.

Consequently, a need exists for improved expander formulations for battery pastes and plates that are effective in overcoming the problem of lead sulfate accumulation during high rate PSOC battery operation, as well as improved expander formulations providing improved battery capacity, efficiency, performance and life for lead-acid batteries of various types. The present disclosure overcomes the above identified disadvantages and/or shortcomings of known prior art expanders, battery pastes and methods for producing negative battery plates, and provides significant improvements there over.

SUMMARY OF THE INVENTION

The present disclosure relates to improved expander formulations used in battery paste compositions for lead-acid batteries. The improved expander formulations incorporate effective amounts of graphite or mixtures of carbon black and graphite. The concentration of the improved expander formulation is also significantly increased beyond the amounts previously used. The negative battery plates made from battery pastes which incorporate the improved expander formulations exhibit considerable improvements in battery capacity, efficiency, performance, and in the life of the batteries as well. In hybrid electric vehicle batteries, the improved expander formulations lessen or minimize the accumulation of lead sulfate on the surface of the negative plate during high rate PSOC battery operation.

Specifically, in valve regulated lead-acid batteries for hybrid electric vehicles, the improved expander formulations include approximately 0.2% to 6% graphite or mixture of carbon and graphite, and preferably approximately 1% to 5%. In particular, improved expanders having approximately 1% to 3% graphite is preferred. Optimally, the improved expanders have approximately 1%-2% carbon black and approximately 1% to 3% graphite, with approximately 2% carbon black and approximately 2% graphite most preferred.

In lead-acid batteries for standard automotive use, specifically for flooded electrolyte automotive batteries, the improved expander formulations include approximately 0.3% to 1.1% graphite or mixture of carbon and graphite, and preferably including 0.3% to 1.0% graphite.

Accordingly, an object of the present disclosure is to provide improved expander formulations incorporating effective amounts of graphite or mixtures of carbon black and graphite, in increased concentrations.

Another object of the present disclosure is to provide a battery paste composition incorporating an improved expander formulation which exhibits considerable improvements in battery capacity, efficiency, performance, and/or in the life cycle of lead-acid batteries.

Yet another object of the present disclosure is to provide lead-acid batteries for hybrid electric vehicle with negative plates having significantly decreased lead sulfate accumulation on the surface of the negative plate during high rate charging with partial-state-of-charge operation, resulting in improved cycle life and electrochemical efficiency.

Yet another object of the present disclosure is to provide standard automotive lead-acid batteries with negative plates providing improved electric performance to conventional expanders in standard battery industry tests, for example, Cold Cranking Amperes tests, Reserve Capacity tests and SAE J240 cycling tests.

Numerous other objects, features and advantages of the present disclosure will become readily apparent from the detailed description and from the claims which follow.

BRIEF DESCRIPTION OF THE DRAWINGS

FIG. 1 is a table illustrating conventional expander formulations and addition rates for the negative plates of various lead-acid batteries.

FIG. 3 is a table illustrating examples of improved expander formulations for valve regulated lead-acid batteries for hybrid electric vehicle.

FIG. 12 is a table illustrating the electrochemical efficiency of negative active material with a conventional expander and the improved expander formulations of Examples 1-5 of FIG. 3.

FIG. 13 is a table illustrating examples of improved expander formulations for standard automotive flooded electrolyte lead-acid batteries.

FIG. 14 is a table illustrating reserve capacity and cold cranking test data on Group 27 and Group 31 batteries containing a conventional expander and the improved expander of Example 6 of FIG. 13.

FIG. 15 is a table illustrating battery life testing data on Group 27 batteries containing a conventional expander and the improved expander of Example 6 of FIG. 13, from an SAE J240 Life Cycles test at forty-one degrees Celsius (41° C.).

FIG. 16 is a table illustrating reserve capacity and cold cranking test data on Group 24 batteries containing a conventional expander and the improved expander of Example 7 of FIG. 13.

DETAILED DESCRIPTION OF THE PREFERRED EMBODIMENT

While the present disclosure is susceptible of embodiment in many different forms, there will be described herein in detail, preferred and alternate embodiments of the present disclosure. It should be understood however, that the present disclosure is to be considered an exemplification of the principles of the invention and is not intended to limit the spirit and scope of the invention and/or claims of the embodiments illustrated.

By way of illustration, seven examples of improved expander formulations of the present disclosure will be described herein. Examples 1-5 are for hybrid electric vehicle batteries, and are illustrated with respect to FIGS. 3-12. Examples 6-7 are for standard automotive batteries, and are illustrated with respect to FIGS. 13-16. It should be understood that further examples will be evident to one of ordinary skill in the art from the disclosure provided herein. It should also be understood that the present disclosure is applicable to any type of batteries which uses an expander in the battery paste mix to form the negative battery plates.

The seven examples of improved expander formulations of the present disclosure are illustrated in FIGS. 3 and 13. Each of these examples is discussed below.

Example 1

Example 1 illustrates an example of an effective expander additive having the composition of 8 kg of barium sulfate, 6 kg of lignosulfonate, preferably sodium lignosulfonate, 20 kg of carbon black and 20 kg of graphite. When added to a typical negative paste batch produced from 1000 kg of leady oxide, this yields a negative plate with 0.8% of barium sulfate, 0.6% of sodium lignosulfonate, 2.0% carbon black and 2.0% of graphite, i.e., 4% mixture of carbon black and graphite. All of the aforementioned percentages are of the oxide used in the paste batch. It should be understood that this is a preferred example composition and that other amounts and ratios will also produce the beneficial results of the present disclosure.

Figure 2:
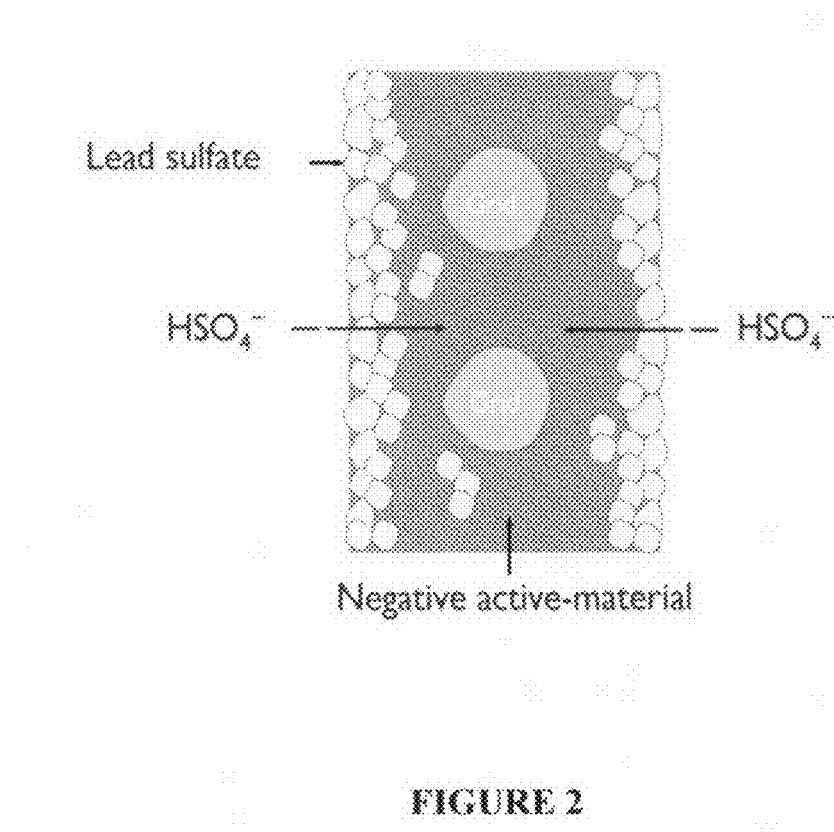
FIG. 2 is an illustration of lead sulfate accumulation on the surface of a negative plate of a lead-acid battery for a hybrid electric vehicle during high rate charging with PSOC operation.
Figure 4:
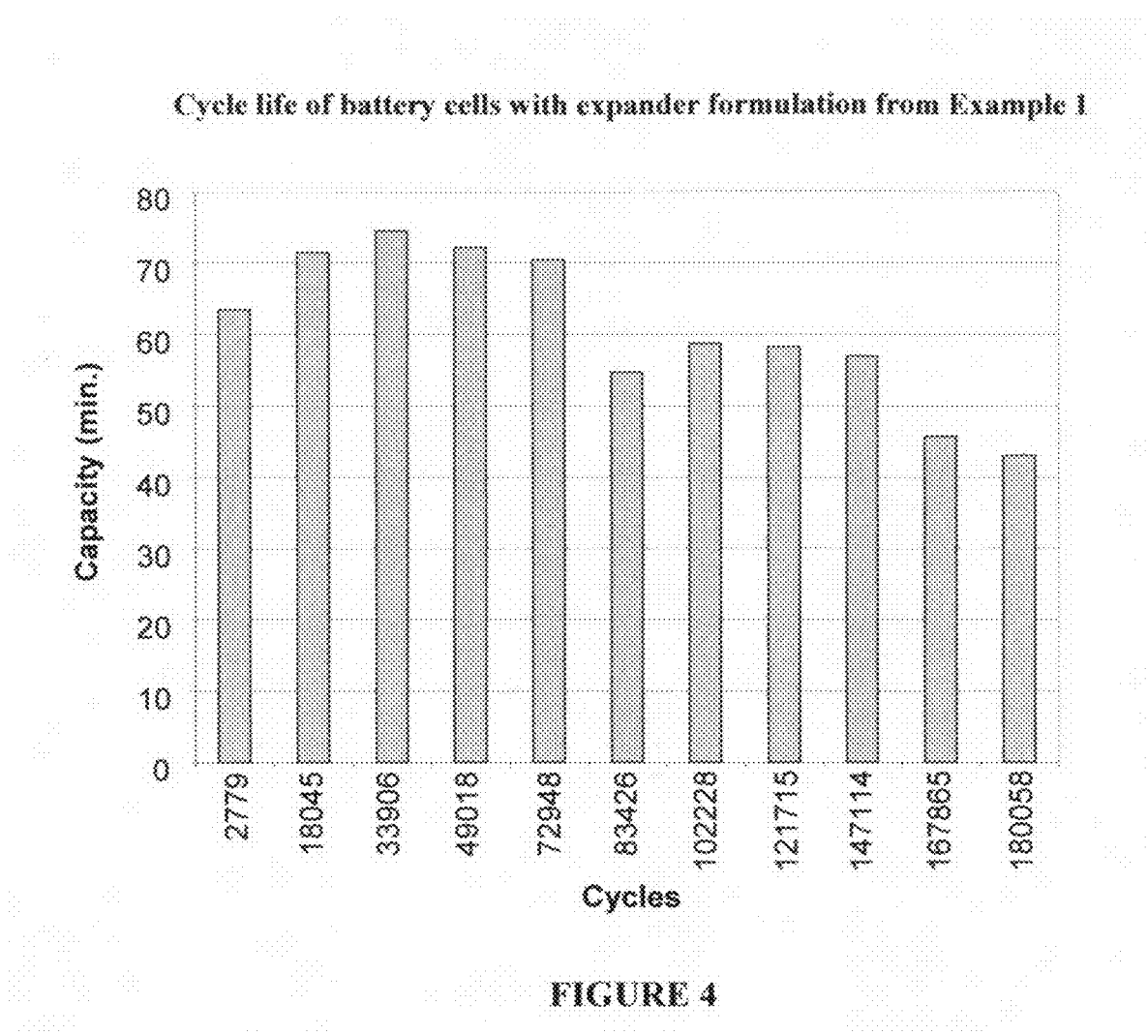
FIGS. 4-8 are charts illustrating the cycle life of battery cells with the improved expander formulations of Examples 1-5 of FIG. 3, respectively.

Lead-acid battery cells having a capacity of 1.74 Ampere-hours were made from negative plates using this expander formulation of Example 1, and compared to cells using a conventional expander blend comprising 8 kg of barium sulfate, 3 kg of lignosulfonate and 1 kg of carbon black. The cells were tested according to a simulated hybrid electric vehicle test schedule comprising a discharge at 3.48 Amperes for one minute followed by a rest period of 30 seconds, which was then followed by a charge at 3.48 Amperes for 1 minute followed by a rest period of 30 seconds. One test sequence is designated as a cycle. This sequence was repeated until the cells failed. A typical test result for the expander of Example 1 is shown in FIG. 4. The improved expander gave 180,058 cycles, while the above described conventional expander was capable of only 23,477 cycles (see FIG. 9).

Example 2

Example 2 illustrates another example of an effective additive having the composition 8 kg of barium sulfate, 2 kg of lignosulfonate, preferably sodium lignosulfonate, and 20 kg of graphite. When added to a typical negative paste batch produced from 1000 kg of leady oxide, this yields a negative plate with 0.8% of barium sulfate, 0.2% of sodium lignosulfonate and 2.0% of graphite. All of the aforementioned percentages are of the oxide used in the paste batch. It should be understood that this is a preferred example composition and that other amounts and ratios will also produce the beneficial results of the present disclosure.

Figure 5:
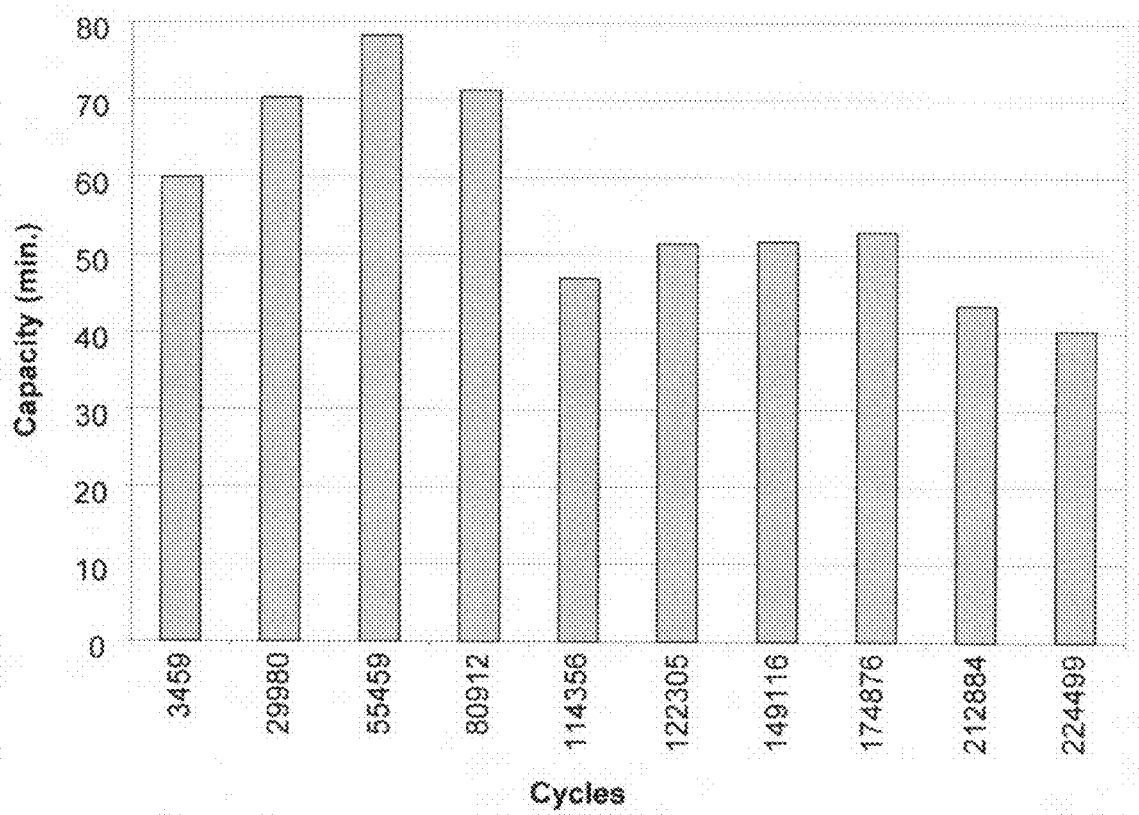

Lead-acid battery cells having a capacity of 1.74 Ampere-hours were made from negative plates using this expander formulation of Example 2, and compared to cells using the conventional expander blend described above with respect to Example 1. The cells were tested according to the simulated hybrid electric vehicle test schedule described above with respect to Example 1. A typical test result for the expander of Example 2 is shown in FIG. 5. The improved expander gave 224,499 cycles, while the above described conventional expander was capable of only 23,477 cycles (see FIG. 9).

Example 3

Example 3 illustrates yet another example of an effective expander additive having the composition 8 kg of barium sulfate, 2 kg of lignosulfonate, preferably sodium lignosulfonate, 20 kg of carbon black and 20 kg of graphite. When added to a typical negative paste batch produced from 1000 kg of leady oxide this yields a negative plate with 0.8% of barium sulfate, 0.2% of sodium lignosulfonate, 2.0% of carbon black and 2.0% of graphite, i.e., 4% mixture of carbon black and graphite. All of the aforementioned percentages are of the oxide used in the paste batch. It should be understood that this is a preferred example composition and that other amounts and ratios will also produce the beneficial results of the present disclosure.

Figure 6:
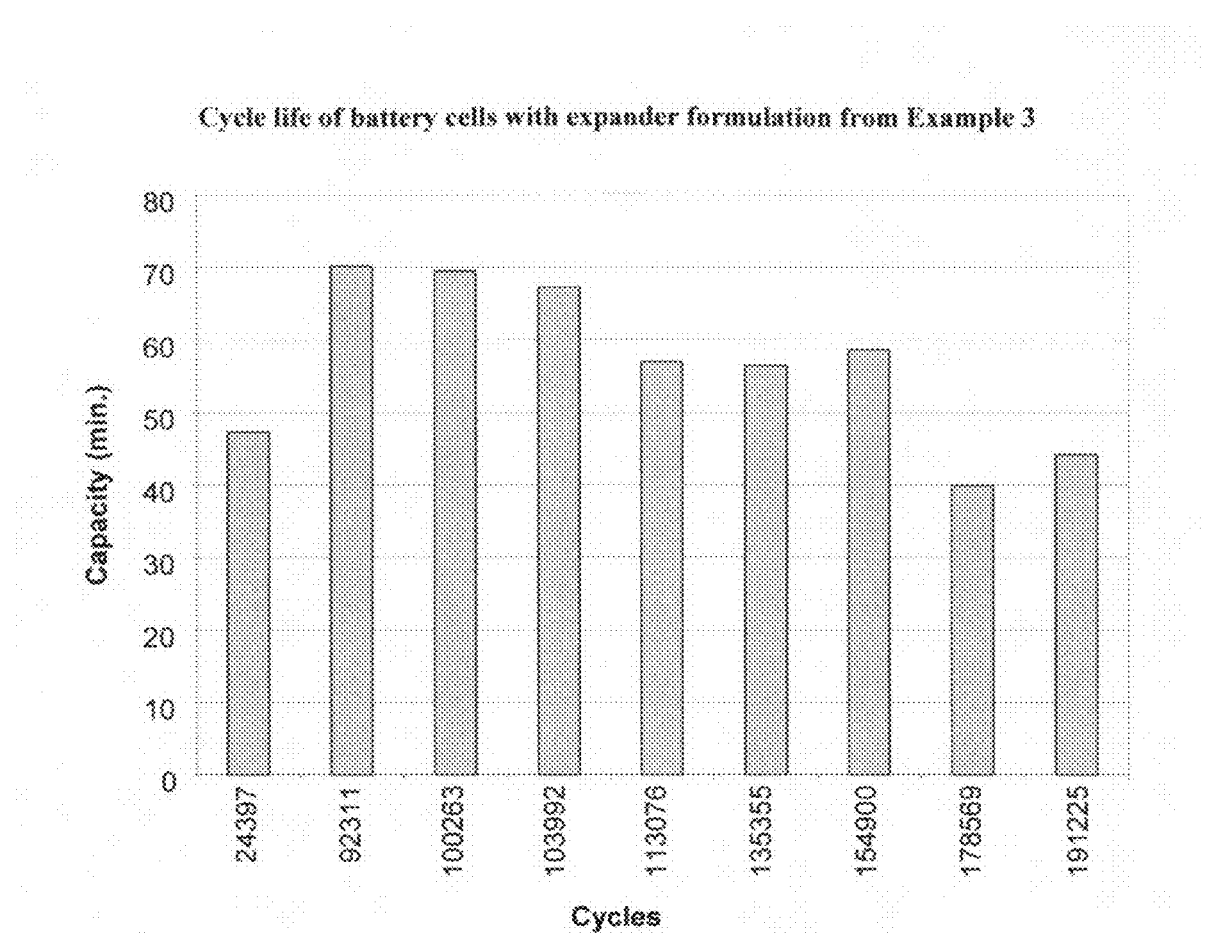

Lead-acid battery cells having a capacity of 1.74 Ampere-hours were made from negative plates using this expander formulation of Example 3, and compared to cells using the conventional expander blend described above with respect to Example 1. The cells were tested according to the simulated hybrid electric vehicle test schedule described above with respect to Example 1. A typical test result for the expander of Example 3 is shown in FIG. 6. The improved expander gave 191,225 cycles, while the above described conventional expander was capable of only 23,477 cycles (see FIG. 9).

Example 4

Example 4 illustrates yet another example of an effective expander additive having the composition 8 kg of barium sulfate, 2 kg of lignosulfonate, preferably sodium lignosulfonate, 10 kg of carbon black and 10 kg of graphite. When added to a typical negative paste batch produced from 1000 kg of leady oxide, this yields a negative plate with 0.8% of barium sulfate, 0.2% of sodium lignosulfonate, 1.0% of carbon black and 1.0% of graphite, i.e., 2% mixture of carbon black and graphite. All of the aforementioned percentages are of the oxide used in the paste batch. It should be understood that this is a preferred example composition and that other amounts and ratios will also produce the beneficial results of the present disclosure.

Figure 7:
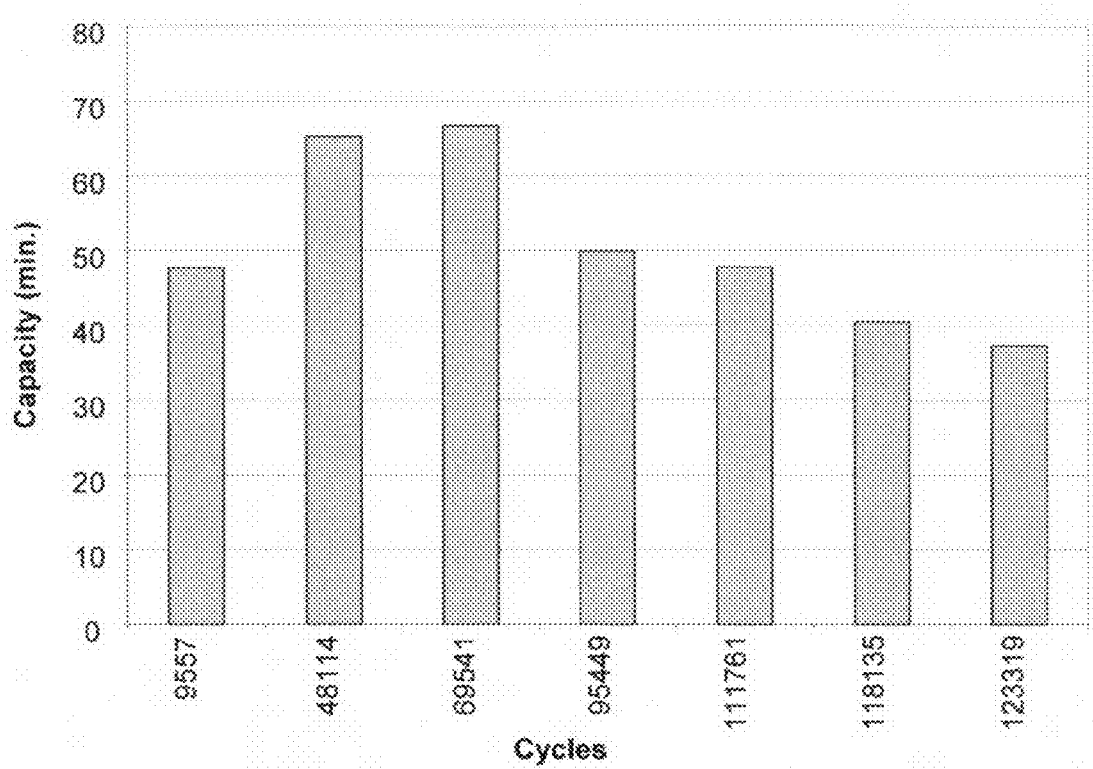

Lead-acid battery cells having a capacity of 1.74 Ampere-hours were made from negative plates using this expander formulation of FIG. 4, and compared to cells using the conventional expander blend described above with respect to Example 1. The cells were tested according to the simulated hybrid electric vehicle test schedule described above with respect to Example 1. A typical test result is shown in FIG. 7. The improved expander gave 123,319 cycles, while the above described conventional expander was capable of only 23,477 cycles (see FIG. 9).

Example 5

Example 5 illustrates yet another example of an effective expander additive having the composition 8 kg of barium sulfate, 2 kg of sodium lignosulfonate, 20 kg of carbon black and 30 kg of graphite. When added to a typical negative paste batch produced from 1000 kg of leady oxide this yields a negative plate with 0.8% of barium sulfate, 0.2% of sodium lignosulfonate, 2.0% of carbon black and 3.0% of graphite, i.e., 5% mixture of carbon black and graphite. All of the aforementioned percentages are of the oxide used in the paste batch. It should be understood that this is a preferred example composition and that other amounts and ratios will also produce the beneficial results of the present disclosure.

Figure 8:
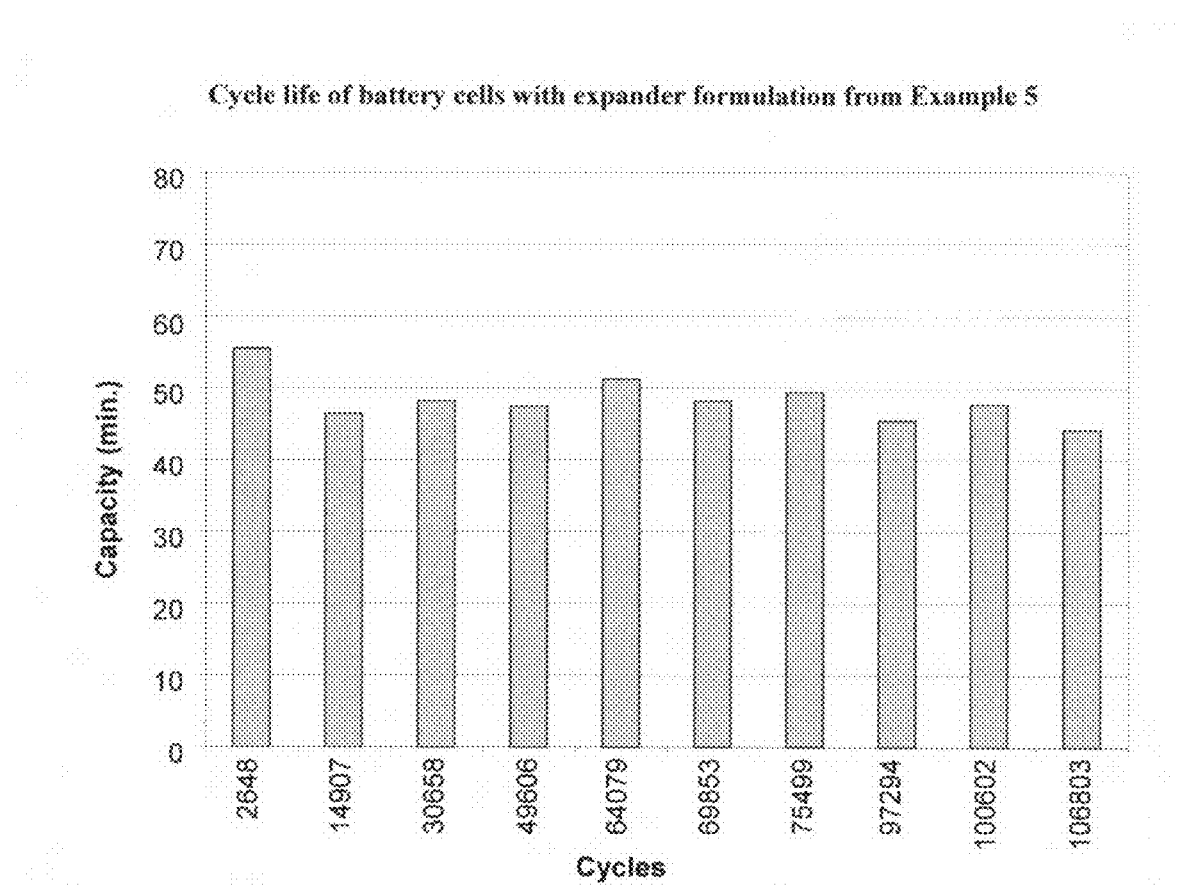
Figure 9:
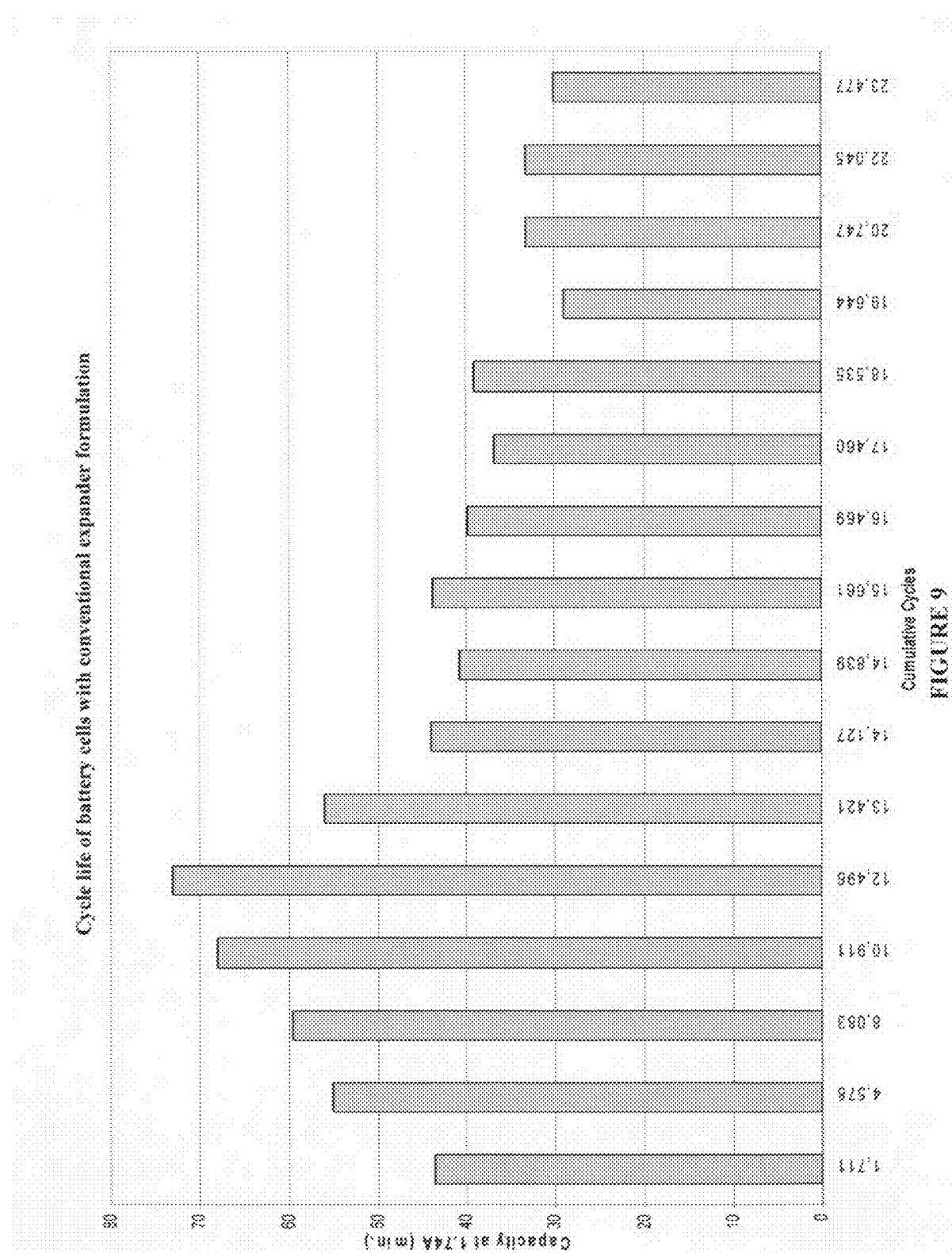
FIG. 9 is a chart illustrating the cycle life of battery cells with a conventional expander formulation for valve regulated lead-acid batteries.

Lead-acid battery cells having a capacity of 1.74 Ampere-hours were made from negative plates using this expander formulation of Example 5, and compared to cells using the conventional expander blend described above with respect to Example 1. The cells were tested according to the simulated hybrid electric vehicle test schedule described above with respect to Example 1. A typical test result for the expander of Example 5 is shown in FIG. 8. The improved expander gave 106,803 cycles, while the above described conventional expander was capable of only 23,477 cycles (see FIG. 9).

Figure 10:
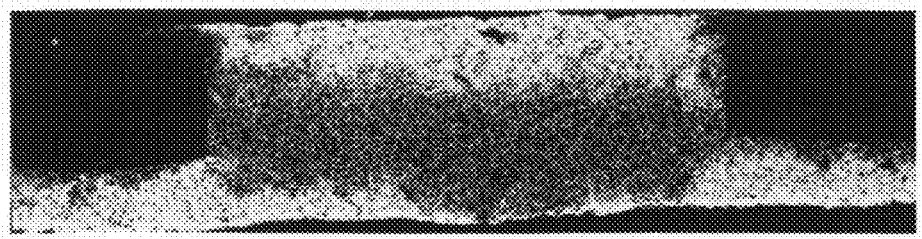
FIG. 10 is an electron microprobe image of the cross section of a negative battery plate with convention expander.
Figure 11:
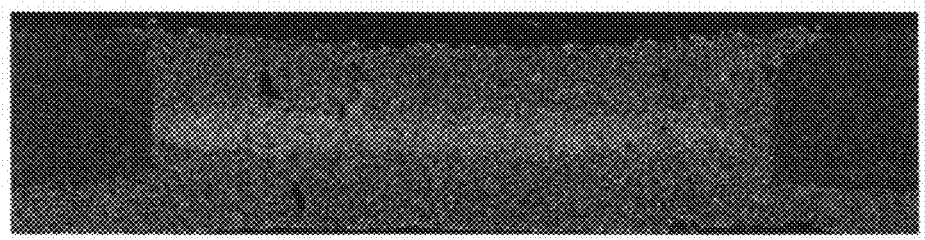
FIG. 11 is an electron microprobe image of the cross section of a negative battery plate with expander of Example 1 of FIG. 3.

These Examples 1-5 show that the improved expanders increase the life of lead-acid battery cells by up to a factor of over 9 times. Examination on the morphology of negative battery plates made with these improved expander additives shows that they are very effective in overcoming the accumulation of lead sulfate on the surface of the negative plate, and instead produce a homogeneous distribution of lead sulfate throughout the negative active material. This is illustrated in FIGS. 10 and 11 which show the distribution of lead sulfate in negative battery plates that had been cycled with the above described conventional expander (see FIG. 10) and with the improved expander additive of Example 1 (see FIG. 11). The light area in FIG. 10 shows the presence of lead sulfate on the surfaces of the plate after charging (1479 cycles), while the plate shown in FIG. 11, after more than twice as many cycles (3596), shows very little lead sulfate after charging.

The improved expander formulations of Examples 1-4 also increase the electrochemical efficiency of the lead-acid battery discharge and charge process. This is measured as the quantity of electricity that can be obtained from a gram of the active material on the plates and is usually measured in units of milliampere-hours per gram of active material. FIG. 12 shows a comparison of the electrochemical efficiency of lead-acid cells utilizing the conventional expander and the improved expanders. It can be seen that the improved expanders of Examples 1-4 resulted in a percentage improvement of up to 18%.

As can be seen in FIG. 12, with respect to Example 5, improved expander formulations having graphite can be made which have lower electrochemical efficiencies than the conventional expander, yet still have much improved cycle life in hybrid vehicle tests (see FIG. 8). The lower electrochemical efficiency of Example 5 is due to displacement of the active material by the high loading of the carbon black/graphite additive.

By way of further examples (Examples 6 and 7, see FIG. 13), improved expander formulations having graphite are also effective in batteries for engine starting applications such as in standard automobile flooded electrolyte batteries, such as Group 24, Group 27 and Group 31 batteries. These Group numbers refer to battery size and they designate the type used in a particular vehicle. Group 24 is a typical regular duty automobile battery. Group 27 is a typical heavy duty automobile battery. Group 31 is a typical heavy duty truck battery that is used in tractor-trailers.

Example 6

Example 6 illustrates an example of an effective expander additive, for standard automobile batteries, having the composition of 6 kg of barium sulfate, 2 kg of lignosulfonate, preferably sodium lignosulfonate, 1 kg of carbon black and 10 kg of graphite. When added to a typical negative paste batch produced from 1000 kg of leady oxide, this yields a negative plate with 0.6% of barium sulfate, 0.2% of sodium lignosulfonate, 0.1% carbon black and 1.0% of graphite, i.e., 1.1% mixture of carbon black and graphite. All of the aforementioned percentages are of the oxide used in the paste batch. It should be understood that this is a preferred example composition and that other amounts and ratios will also produce the beneficial results of the present disclosure.

Standard automotive starting, lighting and ignition batteries of the Group 27 and Group 31 types were made with negative electrodes, containing a conventional expander, containing 0.546% of barium sulfate, 0.225% of lignosulfonate, 0.084% wood flour and 0.136% of carbon black. A second group was constructed with an improved expander containing the same additives and with the addition of 10 kg or 1.0% graphite (Example 6). The two groups were tested according to the Battery Council International cold cranking and reserve capacity tests. The results are shown in FIG. 14. The reserve capacity and the cold cranking performance were improved on both types of battery having the improved expander of Example 6.

Additionally, the Group 27 batteries were also subjected to a life test using the Society of Automotive Engineers (SAE) J240 procedure at a temperature of 41° C./105° F. The results from this test are shown in FIG. 15. As can be seen, SAE J240 life cycle was improved on the Group 27 battery having the improved expander of Example 6.

Example 7

Example 7 illustrates an example of an effective expander additive, for standard automobile batteries, having the composition of 6 kg of barium sulfate, 3 kg of lignosulfonate, preferably sodium lignosulfonate, and 3 kg of graphite. When added to a typical negative paste batch produced from 1000 kg of leady oxide, this yields a negative plate with 0.6% of barium sulfate, 0.3% of sodium lignosulfonate, and 0.3% of graphite. All of the aforementioned percentages are of the oxide used in the paste batch. It should be understood that this is a preferred example composition and that other amounts and ratios will also produce the beneficial results of the present disclosure.

Standard automotive starting, lighting and ignition batteries of the Group 24 types were made with negative electrodes, containing a conventional expander, containing 0.546% of barium sulfate, 0.225% of lignosulfonate, 0.084% wood flour and 0.136% of carbon black. A second group was constructed with an improved expander containing the same additives and with the addition of 3 kg or 0.3% graphite (Example 7). The two groups were tested according to the Battery Council International cold cranking and reserve capacity tests. The results are shown in FIG. 16. The reserve capacity and the cold cranking performance were improved on Group 24 batteries having the improved expander of Example 7.

In general, the improved expanders of the present disclosure contain barium sulfate, lignosulfonate and elevated concentrations of carbon black and/or graphite. Expanders for valve regulated lead-acid batteries for hybrid electric vehicles containing approximately 0.2% to 6%, and preferably 1% to 5%, of either carbon black and/or graphite or mixtures of these materials are effective. Preferably, such improved expanders include approximately 1% to 3% graphite. Optimally, such improved expanders include both carbon black and graphite, in the ranges of approximately 1% to 2% carbon black and approximately 1% to 3% graphite, and most preferably approximately 2% carbon black and 2% graphite.

Expanders for standard automotive lead-acid batteries containing approximately 0.3% to 1.1% of either carbon black and/or graphite or mixtures of these materials are effective. Preferably, such improved expanders include approximately 0.3% to 1.0% graphite.

It should be recognized that these formulas represent general ranges for expander mixtures and for the concentrations of their components in the negative active material and are not intended to limit the spirit or scope of the present disclosure. It should also be understood that other materials such as wood flour and soda ash can be added to the improved expanders of the present disclosure without materially changing the spirit or scope of the present disclosure.

The foregoing specification describes only the preferred embodiment and alternate embodiments of the disclosure. Other embodiments besides the above may be articulated as well. The terms and expressions therefore serve only to describe the disclosure by example only and not to limit the disclosure. It is expected that others will perceive differences, which while differing from the foregoing, do not depart from the spirit and scope of the disclosure herein described and claimed.

What is claimed is:

1. An expander for a battery paste for a negative battery plate for a lead-acid battery, comprising:
   barium sulfate;
   a concentration of graphite or mixture of carbon and graphite of approximately 1% to 5% of an amount of oxide used in the battery paste, wherein the concentration of graphite or mixture of carbon and graphite includes approximately 1% to 3% graphite; and
   a lignosulfonate.

2. The expander of claim 1, wherein the concentration of graphite or mixture of carbon and graphite includes approximately 1% to 2% carbon black.

3. The expander of claim 2, wherein the concentration of graphite or mixture of carbon and graphite includes approximately 2% graphite and approximately 2% carbon black.

4. The expander of claim 1, wherein the concentration of graphite or mixture of carbon and graphite is approximately 1.1% of an amount of oxide used in the battery paste for a battery plate for a flooded electrolyte automotive lead-acid battery.

5. The expander of claim 4, wherein the concentration of graphite or mixture of carbon and graphite includes approximately 1.0% graphite.

6. The expander of claim 1, wherein the concentration of graphite or mixture of carbon and graphite decreases lead sulfate accumulation on the surface of negative active material in the lead-acid battery.

7. The expander of claim 1, wherein the concentration of graphite or mixture of carbon and graphite increases at least one of the electrochemical efficiency, the reserve capacity, the cold cranking performance and the cycle life of the lead-acid battery.

8. A negative battery plate made from a battery paste incorporating the expander of claim 1.

9. The negative battery plate of claim 8, wherein the expander increases at least one of the electrochemical efficiency, the reserve capacity, the cold cranking performance and the cycle life of a lead-acid battery having the negative battery plate.

10. The expander of claim 1, wherein the barium sulfate has a concentration of approximately 0.8% of the amount of oxide used in the battery paste, the graphite has a concentration of approximately 2% of the amount of oxide used in the battery paste, and the lignosulfonate has a concentration of approximately 0.2% of the amount of oxide used in the battery paste.

11. The expander of claim 2, wherein the barium sulfate has a concentration of approximately 0.8% of the amount of oxide used in the battery paste, the carbon black has a concentration of approximately 2% of the amount of oxide used in the battery paste, the graphite has a concentration of approximately 2% of the amount of oxide used in the battery paste, and the lignosulfonate has a concentration of approximately 0.6% of the amount of oxide used in the battery paste.

12. The expander of claim 2, wherein the barium sulfate has a concentration of approximately 0.8% of the amount of oxide used in the battery paste, the carbon black has a concentration of approximately 2% of the amount of oxide used in the battery paste, the graphite has a concentration of approximately 2% of the amount of oxide used in the battery paste, and the lignosulfonate has a concentration of approximately 0.2% of the amount of oxide used in the battery paste.

13. The expander of claim 2, wherein the barium sulfate has a concentration of approximately 0.8% of the amount of oxide used in the battery paste, the carbon black has a concentration of approximately 1% of the amount of oxide used in the battery paste, the graphite has a concentration of approximately 1% of the amount of oxide used in the battery paste, and the lignosulfonate has a concentration of approximately 0.2% of the amount of oxide used in the battery paste.

14. The expander of claim 2, wherein the barium sulfate has a concentration of approximately 0.8% of the amount of oxide used in the battery paste, the carbon black has a concentration of approximately 2% of the amount of oxide used in the battery paste, the graphite has a concentration of approximately 3% of the amount of oxide used in the battery paste, and the lignosulfonate has a concentration of approximately 0.2% of the amount of oxide used in the battery paste.

15. The expander of claim 2, wherein the barium sulfate has a concentration of approximately 0.6% of the amount of oxide used in the battery paste, the carbon black has a concentration of approximately 0.1% of the amount of oxide used in the battery paste, the graphite has a concentration of approximately 1% of the amount of oxide used in the battery paste, and the lignosulfonate has a concentration of approximately 0.2% of the amount of oxide used in the battery paste.

16. A negative battery plate made from a battery paste incorporating the expander of claim 2.

17. The negative battery plate of claim 16, wherein the expander increases at least one of the electrochemical efficiency, the reserve capacity, the cold cranking performance and the cycle life of a lead-acid battery having the negative battery plate.

* * * * *